United States Patent
Kutzke et al.

(10) Patent No.: US 11,661,153 B1
(45) Date of Patent: May 30, 2023

(54) RELEASE SYSTEM FOR A TETHER LINE

(71) Applicant: United States of America as represented by the Secretary of the Navy, Arlington, VA (US)

(72) Inventors: Demetrious T. Kutzke, Panama City, FL (US); Gustavo E. Miranda Lopez, Panama City, FL (US); Robert J. Herman, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 176 days.

(21) Appl. No.: 17/355,796

(22) Filed: Jun. 23, 2021

(51) Int. Cl.

| | |
|---|---|
| *G01S 19/14* | (2010.01) |
| *B63B 21/04* | (2006.01) |
| *B63B 21/20* | (2006.01) |
| *B63B 21/66* | (2006.01) |
| *B63B 79/10* | (2020.01) |

(52) U.S. Cl.
CPC .............. *B63B 21/66* (2013.01); *B63B 21/04* (2013.01); *B63B 21/20* (2013.01); *B63B 79/10* (2020.01); *G01S 19/14* (2013.01); *B63B 2021/203* (2013.01)

(58) Field of Classification Search
CPC ......... B63B 21/66; B63B 21/04; B63B 21/20; B63B 79/10; B63B 2021/203; G01S 19/14; B66C 1/38; B64D 17/00
See application file for complete search history.

(56) References Cited

U.S. PATENT DOCUMENTS

| 4,590,882 A | * | 5/1986 | Murphy | ................. F16G 15/04 24/600.2 |
|---|---|---|---|---|
| 7,380,849 B2 | * | 6/2008 | Mongan | .................... B66C 1/66 294/82.35 |
| 2011/0247183 A1 | * | 10/2011 | Tylaska | ................... F16B 45/02 24/601.5 |

* cited by examiner

*Primary Examiner* — Anthony D Wiest
(74) *Attorney, Agent, or Firm* — James T. Shepherd

(57) ABSTRACT

A release system for a tether line includes a housing having a side that is at least partially open. A tether lead within the housing is adjacent to the side of the housing. A release mechanism in the housing includes a shackle having a closed end and an open end. The shackle is disposed in the housing at a portion therein that is lower than that of the tether lead. The release mechanism also includes a hinge for mounting the shackle within the housing. In a tether-retention mode, the open end of the shackle faces the top of the housing and the shackle is prevented from rotation about the hinge. In a tether-release mode, the shackle is free to rotate about the hinge under gravity wherein the open end of the shackle rotates to face the side of the housing.

20 Claims, 3 Drawing Sheets

RELEASE SYSTEM FOR A TETHER LINE

ORIGIN OF THE INVENTION

The invention described herein may be manufactured and used by or for the Government of the United States of America for Governmental purposes without payment of any royalties.

FIELD OF THE INVENTION

The invention relates generally to line release mechanisms, and more particularly to a release system for a tether line.

BACKGROUND OF THE INVENTION

Conventional methods for deploying objects from ships include the payout of a tether line coupled to an object via a winch-driven mechanism operated onboard the deploying ship. This method works for very large ships and manned vehicles that can be operated by available onboard personnel. In other deployment methods, ship-board personnel drop deployable objects over the side of their ship by hand. The drawback of this approach is imprecise deployment since it is hard to gauge the exact location to deploy the object. Unfortunately, neither of these methods can be used on smaller payload and unmanned vehicles that must operate autonomously with very little or no human intervention. Furthermore, when no personnel are present to oversee an object deployment operation at sea, the system for releasing an object must be simple and robust to assure its proper operation.

SUMMARY OF THE INVENTION

Accordingly, it is an object of the present invention to provide a release system for an object retained by a tether line.

Another object of the present invention is to provide a release system for a tether line that can be operated from a remote location.

Still another object of the present invention is to provide a release system that includes a tether line used to retain an object relative to a moving vessel until it is time to deploy the object from the moving vessel.

Other objects and advantages of the present invention will become more obvious hereinafter in the specification and drawings.

In accordance with the present invention, a release system for a tether line includes a housing having a side that is at least partially open. A tether lead is mounted within the housing adjacent to the side of the housing. A release mechanism mounted within the housing includes a shackle having two legs leading from a closed end of the shackle to an open end of the shackle. The shackle is disposed in the housing at a portion therein that is lower than that of the tether lead. The release mechanism also includes a hinge for mounting the shackle within the housing. In a tether-retention mode of the release mechanism, the open end of the shackle faces the top of the housing and the shackle is prevented from rotation about the hinge. In a tether-release mode of the release mechanism, the shackle is free to rotate about the hinge under gravity wherein the open end of the shackle rotates to face the side of the housing.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
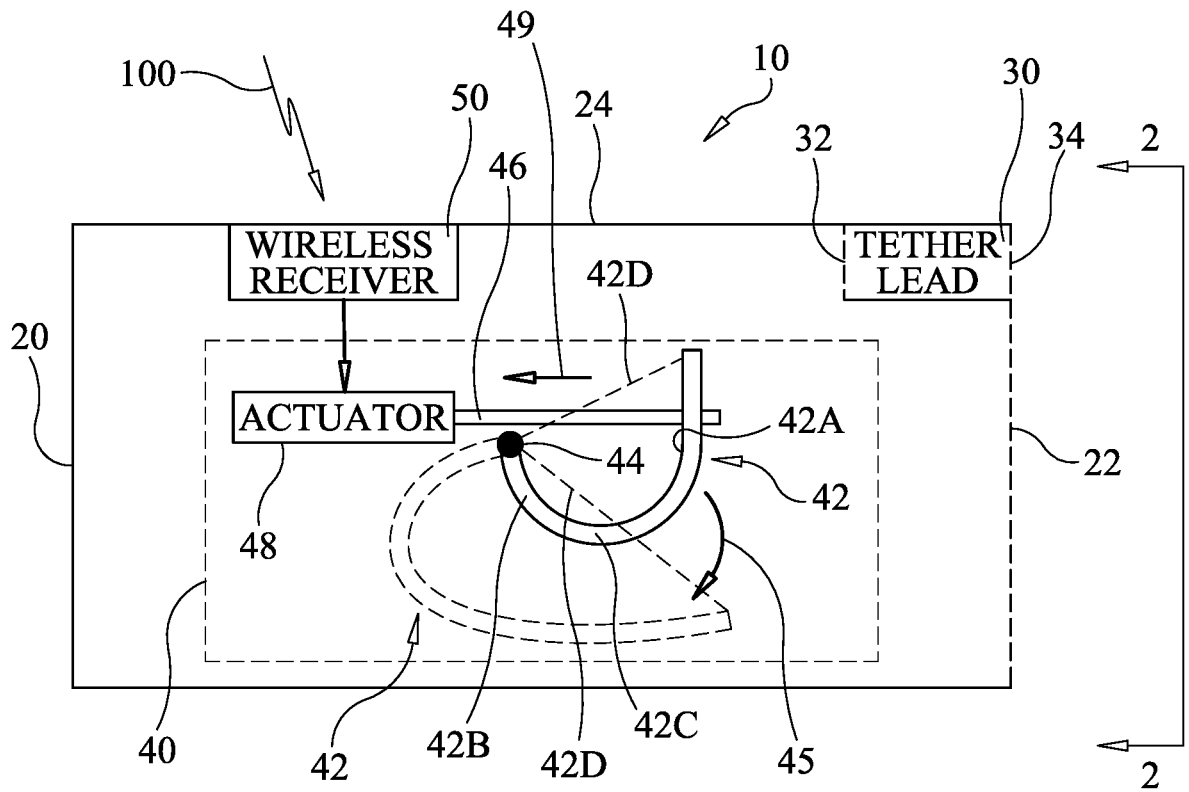
FIG. 1 is a schematic view of a release system for a tether line in accordance with an embodiment of the present invention.

Referring now to the drawings and more particularly to FIG. 1, a schematic view of a release system for a tether line is shown and is referenced generally by numeral 10. In general, release system 10 provides the means to securely retain the end of a tether line (not shown) and reliably release the end of the tether line on demand. Release of the tether line can be initiated by means of a remotely-transmitted wireless signal 100 as will be explained further below. As will also be explained further below, some embodiments of the present invention can be mounted on an unmanned vehicle used to deploy an object coupled to the tether line that is retained and released by release system 10.

Release system 10 includes a housing 20 having a side thereof that is at least partially open as indicated by dashed line 22. Mounted inside housing 20 at a top 24 thereof is a tether lead 30. In general, tether lead 30 is a structure having open ends 32 and 34 such that a tether line (not shown) is readily passed through tether lead 30. That is, tether lead 30 supports the threading of a tether line into housing 20 as well as the rapid movement of the tether line from housing 20 when release system 10 is placed in its tether-release mode of operation as will be explained further below.

Also mounted within housing 20 is a release mechanism contained within a dashed-line box 40. The critical features of release mechanism 40 are illustrated schematically to facilitate a better understanding of the present invention. It should be understood that these features and any support and ancillary structures can be realized in a variety of ways without departing from the scope of the present invention.

Release mechanism 40 includes a shackle 42 pivotally mounted in housing 20 via a hinge 44. In general, shackle 42 is mounted at a position in housing 20 that is lower than tether lead 30 such that a tether line passing through lead 30 travels a path downward from lead 30 to shackle 42 as will be explained later herein. Shackle 42 is generally U-shaped such that it has two legs 42A/42B leading from a closed end 42C to its open end illustrated by dashed-line 42D. Hinge 44 is any pivot supporting structure that allows shackle 42 to rotate downward (as indicated by arrow 45) under the force of gravity when release system 10 is placed in its tether-release mode as will be explained further below. Hinge 44 can be coupled directly to housing 20 or to a supporting structure (not shown) of release mechanism 40 that is mounted to housing 20 without departing from the scope of the present invention.

Shackle 42 is illustrated by solid lines to indicate its position in the tether-retention mode, and is illustrated by dashed lines to indicate its position in the tether-release mode. More specifically, when shackle 42 is in its tether-retention mode, open end 42D of shackle 42 faces towards top 24 of housing 20. When shackle 42 is in its tether-release mode shown by the dashed-line version thereof, shackle 42 has rotated (as indicated by arrow 45) about hinge 44 under the force of gravity such that open end 42D faces generally towards side 22 of housing 20.

In the illustrated embodiment, shackle 42 is retained in its tether-retention mode and released to assume its tether-release mode by a pin 46 whose position is controlled by an actuator 48. For example, pin 46 can be engaged with leg 42A of shackle 42 to retain shackle 42 in its tether-retention mode. To place shackle 42 in its tether-release mode, pin 46 is disengaged from leg 42A by actuator 48 that moves pin 46 as indicated by arrow 49 thereby allowing shackle 42 to rotate downward under the force of gravity as explained above.

Activation of actuator 48 to initiate the tether-release mode of operation can be provided by a remotely-transmitted wireless signal 100. The signal can be a simple Boolean value or, in some embodiments, a geographic location serving as a release trigger. A wireless receiver 50 can be provided on, at, or near housing 20 to receive wireless signal 100 and provide the received trigger to actuator 48. In one embodiment, wireless receiver 50 is a global positioning system (GPS) receiver and wireless signal 100 contains geographic location data.

Figure 2:
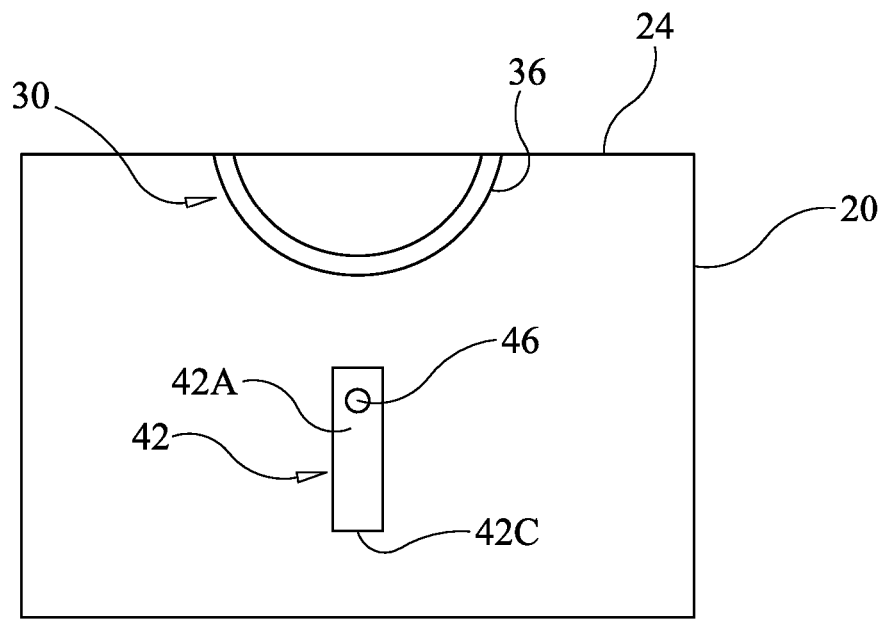
FIG. 2 is an end view of the release system taken along line 2-2 in FIG. 1 illustrating a tether lead in accordance with an embodiment of the present invention.

As mentioned above, tether lead 30 needs to support a tether line's movement through it with minimal impediment. By way of a non-limiting example and with additional reference to FIG. 2, tether lead 30 can be realized by a U-shaped bar 36 that is coupled to top 24 of housing 20 and is oriented perpendicular to the two legs 42A/42B (i.e., only leg 42A is visible in FIG. 2) of shackle 42.

Figure 3:
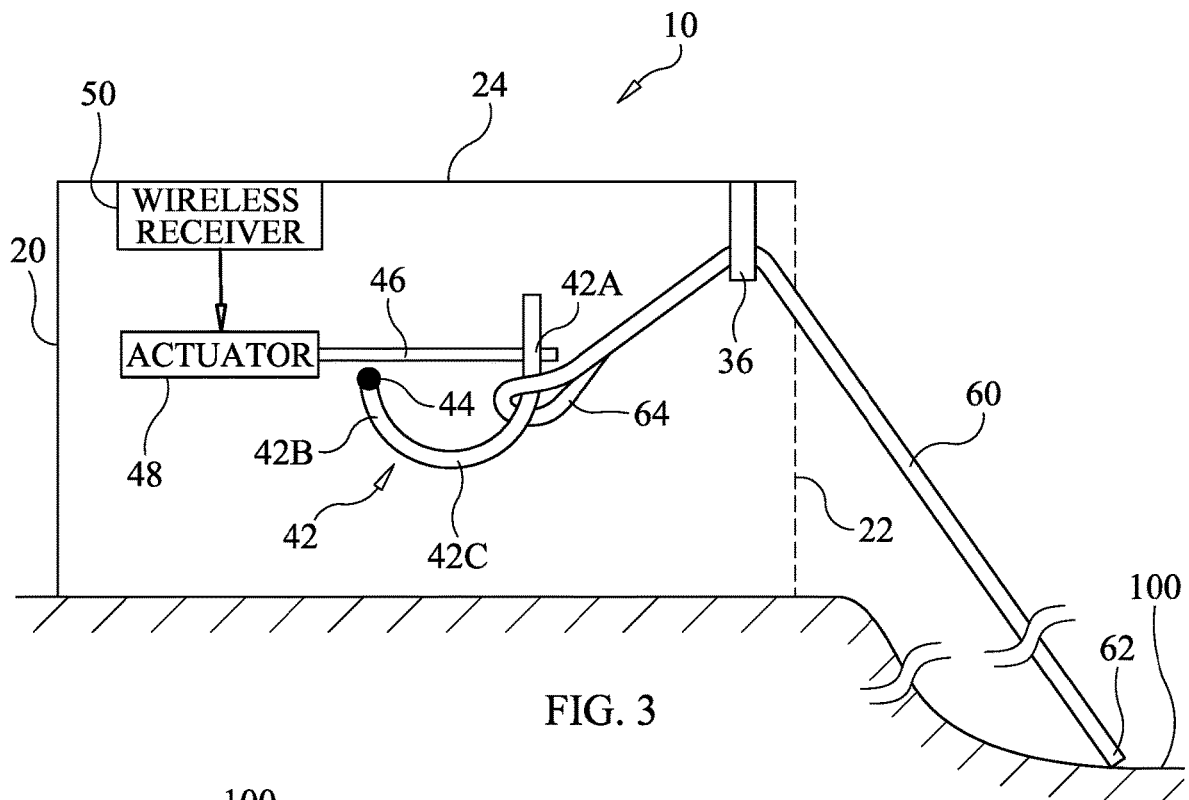
FIG. 3 is a schematic view of a release system to include a tether line in accordance with another embodiment of the present invention illustrating the release system in its tether-retention mode.
Figure 4:
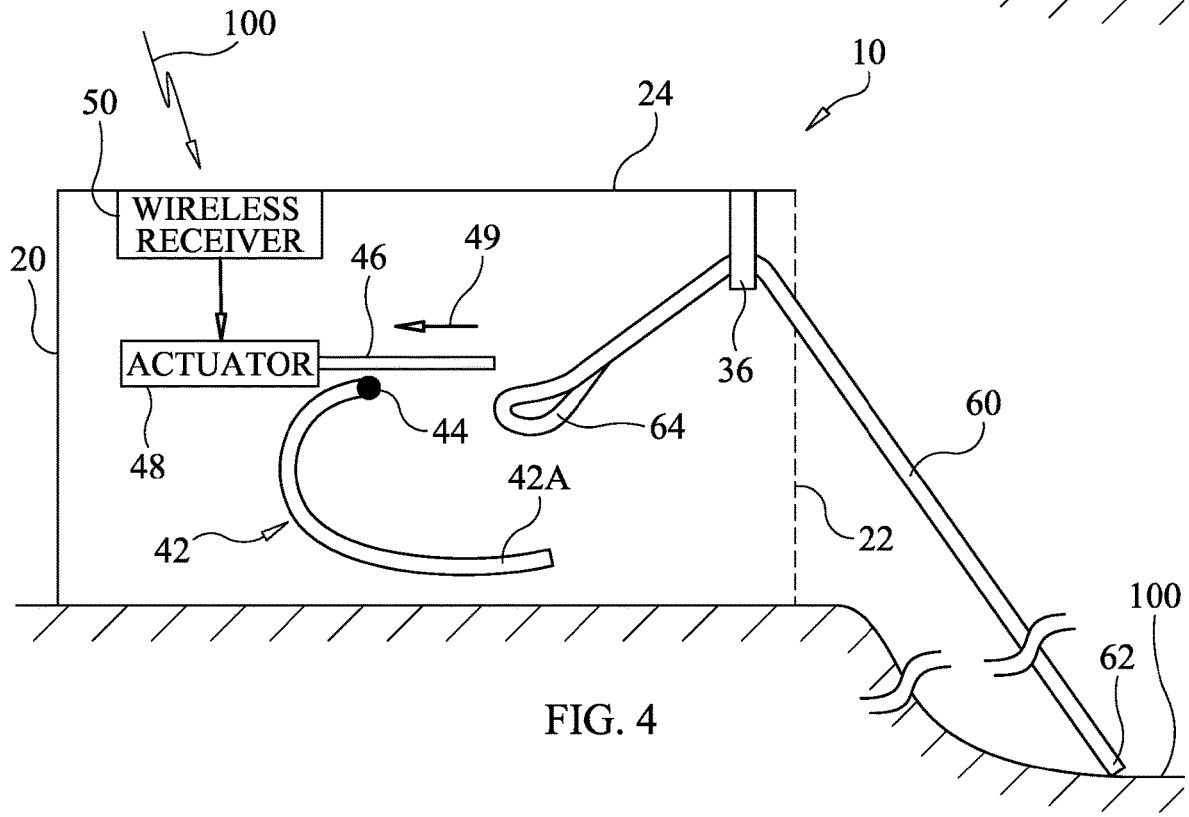
FIG. 4 is a schematic view of the release system illustrated in FIG. 3 with the tether line being released when the release system is in its tether-release mode.

Referring now to FIGS. 3 and 4, release system 10 includes a tether line 60. FIG. 3 illustrates release system 10 in its tether-retention mode, while FIG. 4 illustrates release system 10 in its tether-release mode. In this embodiment, housing 20 is coupled to a structure 100. Tether line 60 has one end 62 coupled to structure 100 and has its other end defining a closed loop 64. The path of tether line 60 can pass through an object (not shown in FIGS. 3 and 4) such that the object is retained by tether line 60 when release system 10 is in its tether-retention mode illustrated in FIG. 3. In the tether-retention mode, leg 42A of shackle 42 passes through closed loop 64 and pin 46 is positioned for engagement with leg 42A as described earlier herein. When wireless receiver 50 receives wirelessly-transmitted release trigger signal 100 (FIG. 4), actuator 48 pulls pin 46 along direction 49 to disengage pin 46 from leg 42A. As a result, shackle 42 is free to rotate about hinge 44 under the force of gravity to thereby assume its tether-release position where closed loop 64 is free to slide off leg 42A. At this point, any tension in tether line 60 will cause it to be pulled through U-shaped bar 36 and out of housing 20.

Figure 5:
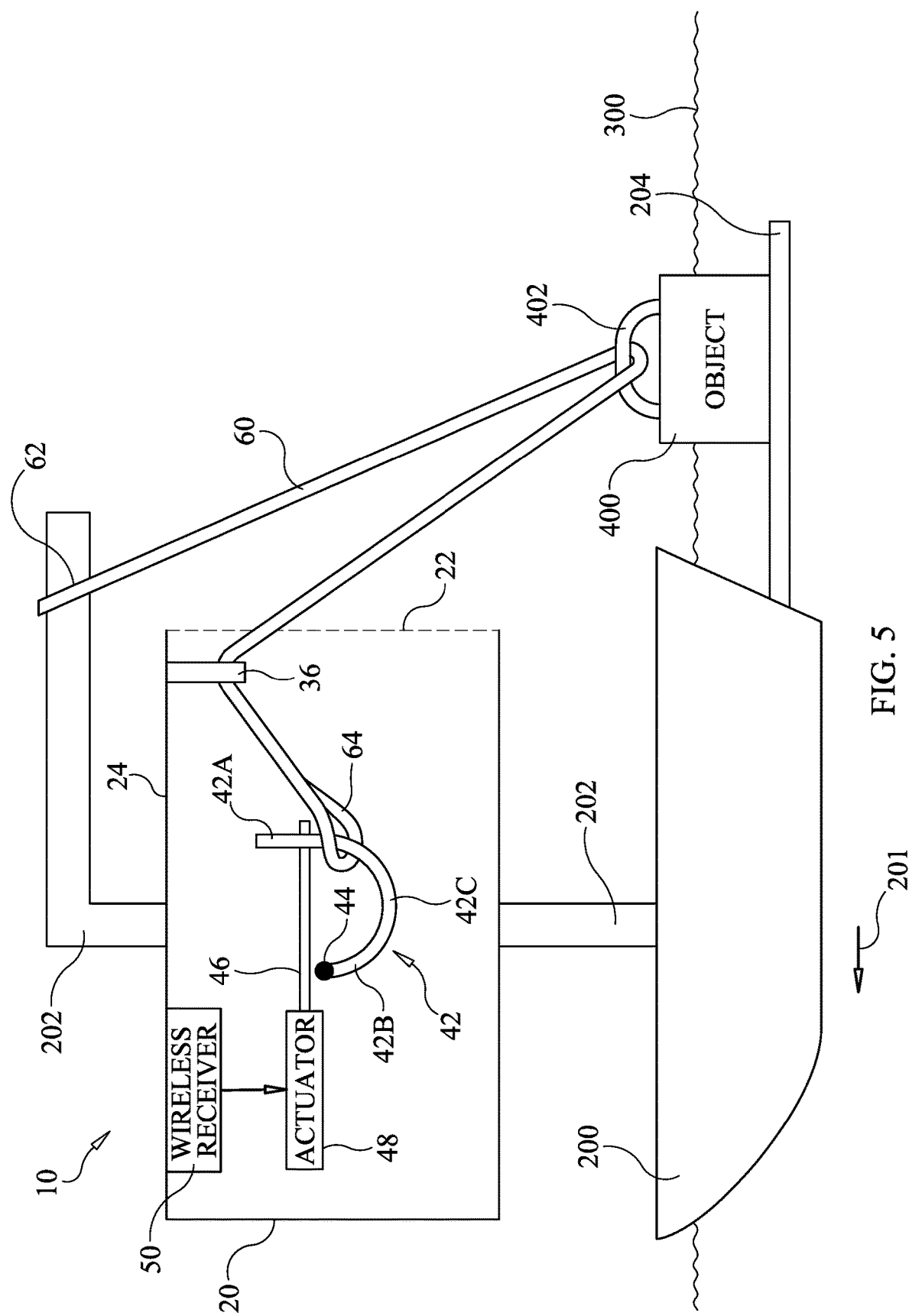
FIG. 5 is a schematic view of the release system and its tether line in use on a moving vessel that is to deploy an unmanned object via a remotely-sent trigger signal in accordance with another embodiment of the present invention.

As mentioned above, the release system of the present invention can be mounted on an unmanned vehicle and used to deploy an object coupled to the release system's tether line. Some embodiments of the present invention can be provided on an unmanned sea-surface vessel that is used to deploy an object from the vessel at a desired location or time. For example and as illustrated in FIG. 5, an unmanned sea-surface vessel 200 includes a support frame 202 on which housing 20 of release system 10 is mounted. Vessel 200 travels in a direction of forward movement (indicated by arrow 201) on the surface of a body of water 300. Vessel 200 is typically equipped with a launch platform 204 that supports an object 400 that is to be deployed in water 300. Launch platform 204 can be any of a variety of structures (e.g., flat decks, cradles, tubes, etc.) designed to support object 400 until such time that object 400 is to be deployed in water 300. In some embodiments, platform 204 positions object 400 partially in water 300 as illustrated.

Housing 20 of release system 10 is mounted on vessel 200 (e.g., on support frame 202 in the illustrated embodiment) such that open side 22 faces in a direction opposite that of forward movement 201. End 62 of tether line 60 is fixed to vessel 200 (e.g., to support frame 202 in the illustrated embodiment) and closed loop 64 has shackle leg 42A passed through it. When release system 10 is in its tether-retention mode, tether line 60 traverses a path that passes through some part of object 400 (e.g., a D-ring 402 coupled to object 400 in the illustrated embodiment). For embodiments where object 400 is partially submerged in water 300 by platform 204, the path of tether line 60 typically leads into housing 20 and through U-shaped bar 36 from a position beneath housing 20.

In operation, as vessel 200 travels in accordance with forward movement 201, release system 10 retains tether line 60 which, in turn, retains object 400 on platform 204 until a remotely-transmitted trigger signal is received by wireless receiver 50 as explained earlier herein. When a trigger signal (e.g., a Boolean value, a geographic location that must match the geographic position of vessel 200, etc.) is received, the trigger signal activates actuator 48 to disengage pin 46 from shackle 42. The tension in tether line 60 created by water 300 moving against object 400 causes closed loop 64 to slide off leg 42A as shackle 42 rotates about hinge 44 such that the open end of shackle 42 faces open side 22 of housing 20. Since end 62 is fixed to vessel 200 at frame 202, tether line 60 is pulled through U-shaped bar 36 and D-ring 402 as the moving water 300 acts on object 400 to thereby deploy object 400 into water 300.

The advantages of the present invention are numerous. The release system includes a simple mechanism to retain or release a tether line. The release system is readily adapted for remote activation thereby making it an ideal candidate for incorporation on an unmanned moving vehicle/vessel used to deploy an object into a surrounding environment.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

The invention claimed is:

1. A release system for a tether line, comprising:
    a housing having a top and a side that is at least partially open;
    a tether lead mounted within said housing adjacent to said side of said housing; and
    a release mechanism mounted within said housing, said release mechanism including
        a shackle having two legs leading from a closed end of said shackle to an open end of said shackle, said shackle being disposed in said housing at a portion therein that is lower than that of said tether lead, and a hinge for mounting said shackle within said housing, wherein, in a tether-retention mode of said release mechanism, said open end of said shackle faces said top of said housing and said shackle is prevented from rotation about said hinge, and wherein, in a tether-release mode of said release mechanism, said shackle is free to rotate about said hinge under gravity wherein said open end of said shackle rotates to face said side of said housing.

2. A release system as in claim 1, wherein said tether lead comprises a U-shaped bar oriented perpendicular to said two legs of said shackle.

3. A release system as in claim 1, further comprising a wireless receiver coupled to said release mechanism, said wireless receiver adapted to receive a trigger signal for initiating said tether-release mode.

4. A release system as in claim 3, wherein said trigger signal is selected from the group consisting of a Boolean value and a geographic location.

5. A release system as in claim 1, wherein said release mechanism further includes a pin for engaging one of said two legs of said shackle when said release mechanism is in said tether-retention mode, and for disengaging from said one of said two legs of said shackle when said release mechanism is in said tether-release mode.

6. A release system, comprising:

a housing having a side that is at least partially open, said housing adapted to be coupled to a structure;

a tether line having a first end terminating in a closed loop and having a second end adapted to be coupled to the structure;

an open-ended tether lead mounted at a top of and within said housing adjacent to said side of said housing;

said tether line passing through said tether lead between said first end and said second end; and a release mechanism mounted within said housing, said release mechanism including a shackle having two legs leading from a closed end of said shackle to an open end of said shackle, said shackle being disposed in said housing at a portion therein that is lower than that of said tether lead, and a hinge for mounting said shackle within said housing, wherein, in a tether-retention mode of said release mechanism, one of said two legs of said shackle passes through said closed loop of said tether line, said open end of said shackle faces said top of said housing, and said shackle is prevented from rotation about said hinge, and wherein, in a tether-release mode of said release mechanism, said shackle is free to rotate about said hinge under gravity, wherein said open end of said shackle rotates to face said side of said housing wherein said closed loop of said tether line is free to slide off said one of said two legs.

7. A release system as in claim 6, wherein said tether lead comprises a U-shaped bar oriented perpendicular to said two legs of said shackle.

8. A release system as in claim 6, further comprising a wireless receiver coupled to said release mechanism, said wireless receiver adapted to receive a trigger signal for initiating said tether-release mode.

9. A release system as in claim 8, wherein said trigger signal is selected from the group consisting of a Boolean value and a geographic location.

10. A release system as in claim 6, wherein said release mechanism further includes a pin for engaging one of said two legs of said shackle when said release mechanism is in said tether-retention mode, and for disengaging from said one of said two legs of said shackle when said release mechanism is in said tether-release mode.

11. A release system as in claim 10, wherein said pin spans said open end of said shackle when said release mechanism is in said tether-retention mode to prevent said closed loop of said tether line from sliding off said one of said two legs.

12. A release system, comprising:

a housing adapted to be coupled to a moving structure having a direction of forward movement, said housing having a side facing opposite the direction of forward movement, said side being at least partially open;

a tether line having a first end terminating in a closed loop and having a second end adapted to be coupled to the structure, said tether line traversing a path that leads into said housing from a position beneath said housing, said path adapted to pass through a portion of an object to be released into a surrounding environment while the structure moves in the direction of forward movement;

an open-ended tether lead mounted at a top of and within said housing adjacent to said side of said housing;

said tether line passing through said tether lead between said first end and said second end; and a remotely-actuated release mechanism mounted within said housing, said release mechanism including a shackle having two legs leading from a closed end of said shackle to an open end of said shackle, said shackle being disposed in said housing at a portion therein that is lower than that of said tether lead and forward of said tether lead relative to the direction of forward movement, and a hinge for mounting said shackle within said housing, wherein, in a tether-retention mode of said release mechanism, one of said two legs of said shackle passes through said closed loop of said tether line, said open end of said shackle faces said top of said housing, and said shackle is prevented from rotation about said hinge, and wherein, in a tether-release mode of said release mechanism, said shackle is free to rotate about said hinge under gravity, wherein said open end of said shackle rotates to face said side of said housing wherein said closed loop of said tether line is free to slide off said one of said two legs.

13. A release system as in claim 12, wherein said tether lead comprises a U-shaped bar oriented perpendicular to said two legs of said shackle.

14. A release system as in claim 12, further comprising a wireless receiver coupled to said release mechanism, said wireless receiver adapted to receive a trigger signal for initiating said tether-release mode.

15. A release system as in claim 14, wherein said trigger signal is selected from the group consisting of a Boolean value and a geographic location.

16. A release system as in claim 12, wherein said release mechanism further includes a pin for engaging one of said two legs of said shackle when said release mechanism is in said tether-retention mode, and for disengaging from said one of said two legs of said shackle when said release mechanism is in said tether-release mode.

17. A release system as in claim 16, wherein said pin spans said open end of said shackle when said release mechanism is in said tether-retention mode to prevent said closed loop of said tether line from sliding off said one of said two legs.

18. A system for remotely deploying an object, comprising:
 a vehicle adapted to tow the object in a forward direction;
 a housing coupled to said vehicle at a location forward of the object, said housing having a side facing toward the object, said side being at least partially open;
 a tether line having a first end terminating in a closed loop and a second end coupled to said vehicle, said tether line configured to traverse a path that leads from said second end, through a portion of the object when the object is being towed by said vehicle, and into said housing;
 an open-ended tether lead mounted at a top of and within said housing adjacent to said side of said housing, wherein said tether line passes through said tether lead between said first end and said second end;
 a remotely-actuated release mechanism mounted within said housing, said release mechanism including
  a shackle having two legs leading from a closed end of said shackle to an open end of said shackle,
  a hinge for rotatably mounting said shackle within said housing,
  a pin configured to span across and close said open end of said shackle and engage one of said two legs of said shackle to prevent said shackle from rotating about said pin, wherein lateral displacement of said pin will cause said pin to disengage from said one of said two legs, thereby allowing said shackle to rotate and thereby opening said open end of said shackle, and
  an actuator coupled to said pin, said actuator being operable to cause said lateral displacement of said pin; and
 a wireless receiver coupled to said actuator, said wireless receiver adapted to receive a trigger signal for initiating said actuator;
 wherein, in a tether-retention mode of said release mechanism, said one of said two legs of said shackle passes through said closed loop of said tether line, and said pin closes said open end of said shackle and prevents said shackle from rotating about said hinge; and
 wherein, in a tether-release mode of said release mechanism, said pin is displaced to release said one of said two legs of said shackle, allowing said shackle to rotate and release said closed loop of said tether line.

19. A system as in claim 18, wherein said vehicle is an unmanned sea-surface vessel having a support frame on which said housing is mounted and a launch platform configured to support the object, said launch platform being configured to position the object partially in water when said vessel is towing the object in the forward direction.

20. A system as in claim 18, wherein said wireless receiver is a global positioning system (GPS) receiver and said trigger signal is a geographic location.

* * * * *